(12) United States Patent
Ooms

(10) Patent No.: US 9,751,724 B2
(45) Date of Patent: Sep. 5, 2017

(54) STAIR LIFT WITH A SAFETY DEVICE

(71) Applicant: Otto Ooms B.V., Bergambacht (NL)

(72) Inventor: Andre Ooms, Bergambacht (NL)

(73) Assignee: Otto Ooms B.V., Bergambacht (NL)

( * ) Notice: Subject to any disclaimer, the term of this patent is extended or adjusted under 35 U.S.C. 154(b) by 414 days.

(21) Appl. No.: 14/383,033

(22) PCT Filed: Mar. 13, 2013

(86) PCT No.: PCT/NL2013/050169
§ 371 (c)(1),
(2) Date: Sep. 4, 2014

(87) PCT Pub. No.: WO2013/137730
PCT Pub. Date: Sep. 19, 2013

(65) Prior Publication Data
US 2015/0068847 A1 Mar. 12, 2015

(30) Foreign Application Priority Data
Mar. 14, 2012 (NL) .................... 2008488

(51) Int. Cl.
*B66B 9/08* (2006.01)
*H04W 8/22* (2009.01)

(52) U.S. Cl.
CPC .............. *B66B 9/08* (2013.01); *H04W 8/22* (2013.01); *B66B 2009/0884* (2013.01)

(58) Field of Classification Search
CPC ............... B66B 9/08; B66B 2009/08; B66B 2009/0884; B66B 2009/0892; H04W 8/22

USPC ......... 187/200–202, 247, 380–388, 391, 393
See application file for complete search history.

(56) References Cited

U.S. PATENT DOCUMENTS

| 4,904,916 A | | 2/1990 | Gisske | |
| 5,052,521 A | * | 10/1991 | Wendt | B66B 9/083 182/148 |
| 5,105,914 A | * | 4/1992 | Holden | B66B 9/0846 187/201 |

(Continued)

FOREIGN PATENT DOCUMENTS

| EP | 2377795 | | 10/2011 | |
| GB | 2269252 A | * | 2/1994 | B61L 3/225 |

(Continued)

*Primary Examiner* — Anthony Salata
(74) *Attorney, Agent, or Firm* — Marcus C. Dawes; Daniel L. Dawes

(57) ABSTRACT

A device for conveying a person from a first to a second level, in particular a stair lift, which includes a rail (9) which extends between said first and said second level, a frame (3) which is designed to engage the rail in such a manner that it can be moved along the rail, and wherein the frame is configured to move along the rail, and a carrier (4) on which the person can seat himself, in particular a chair, wherein the device is further provided with a safety device which includes a central processing unit and a wireless communication network designed to communicate status information on components of the device and/or objects in the vicinity of the device to the central processing unit, and wherein the processing unit is designed for deciding, on the basis of the communicated status information, whether or not the frame is to be moved along the rail.

7 Claims, 1 Drawing Sheet

(56) References Cited

U.S. PATENT DOCUMENTS

| | | | | |
|---|---|---|---|---|
| 5,230,405 | A * | 7/1993 | Bartelt | B66B 9/0815 187/201 |
| 6,446,761 | B1 * | 9/2002 | Motoyama | B66B 1/34 187/247 |
| 6,601,679 | B2 * | 8/2003 | Crenella | B66B 1/34 187/247 |
| 7,426,981 | B2 * | 9/2008 | Bacellar | B66B 1/34 187/247 |
| 7,523,807 | B2 * | 4/2009 | Vroegindeweij | B66B 9/0846 187/201 |
| 8,146,713 | B2 * | 4/2012 | Rosenthal | B66B 9/083 187/200 |
| 8,356,698 | B2 * | 1/2013 | Zepke | B66B 1/468 187/290 |
| 8,660,565 | B2 * | 2/2014 | Hall | B66B 5/0031 455/447 |
| 9,457,992 | B2 * | 10/2016 | Ooms | B66B 9/08 |
| 9,469,507 | B2 * | 10/2016 | Awerbuch | B66B 9/08 |
| 2010/0314201 | A1 * | 12/2010 | Stannah | B66B 9/08 187/201 |
| 2011/0278096 | A1 * | 11/2011 | Kentenich | B66B 1/34 187/201 |
| 2015/0375961 | A1 * | 12/2015 | Jakes | B66B 5/0012 340/870.07 |

FOREIGN PATENT DOCUMENTS

| | | |
|---|---|---|
| GB | 2463734 | 3/2010 |
| WO | WO-9304971 | 3/1993 |
| WO | WO-2009098480 | 8/2009 |

\* cited by examiner

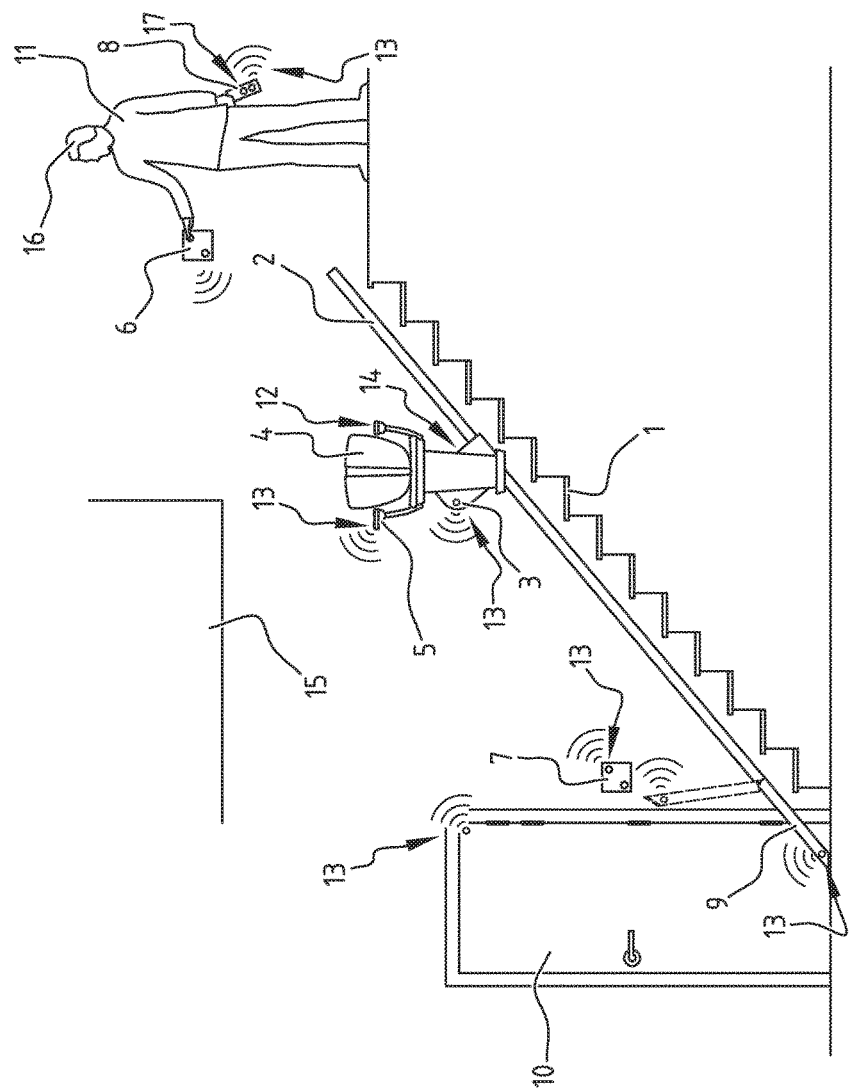

STAIR LIFT WITH A SAFETY DEVICE

The present invention relates to a device for conveying a person from a first to a second level, in particular a stair lift, comprising a rail which extends between said first and said second level, a frame which is provided with engaging means designed to engage the rail in such a manner that it can be moved along the rail and drive means designed to cause the frame to move along the rail, and a carrier mounted to the frame on which the person can seat himself, in particular a chair, which device is further provided with means for locking and unlocking the stair lift, using control means intended for that purpose, such as a key, an on/off button, a detector for wireless detection of the presence of an electronic key that a person may carry near the device, or a remote control unit for locking and unlocking the device.

Such a stair lift is described in EP 2 377 795.

The object of the present invention is to provide a stair lift which is easy to operate, which offers a high degree of safety, which is easy to adapt to local situations and/or which is reliable.

In order to achieve that object, the device further comprises a safety device comprising a central processing unit and a wireless communication network designed to communicate status information on components of the device and/or objects in the vicinity of the device that are not mounted on or to the frame to the central processing unit, wherein the processing unit is designed for deciding, on the basis of the communicated status information, whether or not the frame is to be moved along the rail by the drive means.

The wireless communication network is preferably an RF communication network that can operate at several pre-adjustable frequencies. Said communication network may operate according to an IEEE 802.11 (Wi-Fi) protocol, for example, but preferably a different frequency is used, so that interference with other Wi-Fi networks is prevented.

The status information on components of the device may for example comprise status information on one or more of the following aspects:
- a locking status of the device to be set by a user;
- the position of a movable rail portion of the rail;
- the remaining capacity of a battery which supplies power to a component of the device;
- the position of the frame relative to the rail;
- the spatial orientation of the carrier; and
- the correct functioning of an indicator unit on the device, such as a signal light or a display screen that informs the user about the status of the device.

The locking status of the device to be set by a user may for example be the status of a physical lock present on the carrier, which can be locked and unlocked by means of a key, but preferably the locking status is a changeable parameter in an electronic memory that is connected to the central processing unit, which can for example be changed by means of a remote control unit functioning as a key.

The movable rail portion of the rail is for example a rail portion which is located at the end of the rail and which forms a projection that may form an obstacle. Such a movable rail portion is described in EP-A-0 874 778. By incorporating a sensor capable of communicating with the central processor, the movement of the frame along the rail can be blocked as long as the rail portion is not perfectly contiguous to the rail.

By communicating the remaining capacity of a battery that supplies power to a component of the device to the central processing unit, movement of the frame can be blocked if the supply of power to a component cannot be sufficiently guaranteed.

The status information on objects in the vicinity may also comprise status information on the position of a movable object, for example a door, in the vicinity of the stair lift, which, in a particular position thereof, forms an obstacle to the functioning of the device, to which end the object is provided with means for detecting the position of the object and with means connected to the communication network for communicating the status information to the central processing unit. The status information on objects in the vicinity may also comprise information on the position of a movable object, for example the head or another part of the body of a person on the stair lift, which is detected before the object hits the obstacle, to which end the obstacle is provided with means for detecting the approach of the object and with means connected to the communication network for communicating the status information to the central processing unit.

The device preferably comprises an indicator unit, such as a signal light or a display screen, which is preferably present on the carrier and which informs the user about the status of the device, which indicator unit is provided with means connected to the communication network, wherein the central processing unit and the indicator unit are designed to communicate at least the locking status of the device to the user.

The central processing unit is preferably designed to change the locking status after a predetermined period of inactivity of the device, such that a user must change the locking status anew in order to be able to cause the frame to move along the rail, whether or not via control means and the drive means.

Preferably, the device further comprises a remote control unit provided with means connected to the communication network, by means of which the user can change the locking status. Such a remote control unit provided with a pushbutton is much easier to control than a traditional mechanical lock provided with a key, especially for people who are physically challenged.

The device is preferably provided with control units which are fixedly mounted to the carrier, at a fixed location near the upper side of the staircase and at a fixed location near the bottom side of the staircase, by means of which a user can cause the frame to move along the rail via the drive means and which are provided with means connected to the communication network.

The invention will now be explained in more detail with reference to an embodiment shown in the FIGURE, which schematically shows a staircase with a stair lift.

As shown in the FIGURE, a rail 2 is mounted along a staircase 1, along which rail a frame 3 can be moved by drive means. The frame is provided with a chair 4 which can be rotated about a horizontal axis so as to maintain the seat of the chair 4 in a horizontal orientation.

Provided on the chair are control means 5, for example in the form of control buttons, and a display screen 12 that is mounted on the chair arm. Using the control means 5, a user seated on the chair 4 can move the frame 3 with the chair 4 up and down.

Mounted on the wall near the upper side and the bottom side of the staircase are control means 6, 7, by means of which a user can move the frame 3 with the chair 4 up or down so as to seat himself or herself thereon.

The stair lift system further comprises a central processing unit 14 mounted in the frame 3, which is capable of communication with the control means 5, 6, 7. The central processing unit is to that end provided with wireless communication means, such as Wi-Fi 13. Preferably, however, a frequency different from the usual Wi-Fi standard is used so as to prevent malfunctions caused by interference. The control means 5, 6, 7 also comprise wireless communication means, which are capable of communicating data to the central processing unit. The central processing unit is designed to have the control means 5, 6, 7 activate the drive means of the stair lift only if a number of requirements are met.

A first requirement is that the system must be unlocked. The system is to that end provided with a remote control unit 8, which has only one function, viz. enabling the user 11 to lock and unlock the stair lift system. The remote control unit 8 is to that end also provided with wireless communication means which are capable of communicating data to the wireless communication means of the central processing unit; via the remote control unit 8 the status of the central processing unit can be changed from inactive to active. The drive means of the stair lift can only be activated in the active status. The central processing unit is further designed to change into the inactive status automatically after a predetermined period of inactivity. If the locking status is the active status, this will be indicated on the remote control unit and on the display screen on the chair 4 by means of a signal light.

Furthermore, the physical environment of the stair lift must meet a number of requirements. In this example, the rail 2 comprises a motor-driven movable rail portion 9, which can be pivoted upwards. Disposed behind the movable rail portion 9 is a motor-driven hinged door 10. The door 10 must be locked and the rail portion 9 must be swung down, in that order, before the stair lift is allowed to move along the rail 2. The movable rail portion 9 and the door 10 are to that end provided with wireless communication means capable of communication with the wireless communication means of the central processing unit. Via the wireless communication means, the central processing unit can control the motors of the movable rail portion 9 and the door 10 to open and close the same after the user 11 has given a command to that effect via the control means 5, 6, 7.

The movable rail portion 9 and the door 10 are further provided with sensors which are capable of detecting whether the movable rail portion 9 is actually in its swung-down position and whether the door 10 is actually in its locked position, respectively. The detected status is communicated to the central processing unit, and the central processing unit is designed to cause the movable rail portion 9 to swing down only if the door 10 is locked, and to allow the frame 3 with the chair 4 to move along the rail 2 only if the door 10 is in its locked position and the movable rail portion 9 is in its swung-down position. Furthermore, sensors may be placed near obstacles, such as a lowered part of a ceiling 15, which sensors are capable of detecting a person's 11 head 16 approaching, for example, and communicating this to the central processing unit for the purpose of stopping the frame 3.

The wireless communication network offers further possibilities for enhancing the safety of the stair lift, depending on the situation. Thus, if the presence of a caregiver of the user 11 of the stair lift is required at all times during use of the stair lift, the caregiver may carry a transmitter which continuously makes the presence of the transmitter known to the central processing unit via the wireless communication network. As soon as the caregiver carrying the transmitter is removed too far from the stair lift, the stair lift will be locked by the central processing unit.

Also the status of various components of the stair lift can be easily communicated via the wireless communication network. Thus, the status of a battery 17 in the system can be communicated to the user via the display screen on the chair 4, so that the user can have the battery 17 exchanged, if necessary. Furthermore, a position of the frame relative to the rail and/or the correct operation of the various electronic components can be communicated with the central processing unit by means of sensors mounted on the rail, so that the central processing unit can act in response thereto.

The invention claimed is:

1. A stair lift for conveying a person from a first to a second level comprising;
    a rail which extends between said first and said second level;
    a frame which is provided with engaging means designed to engage the rail in such a manner that it can be moved along the rail and drive means designed to cause the frame to move along the rail;
    a carrier mounted to the frame on which the person can seat himself; and
    a safety device comprising a central processing unit and a wireless communication network designed to communicate status information on components of the stair lift and/or objects in the vicinity of the stair lift that are not mounted on or to the frame to the central processing unit, wherein the processing unit is designed for deciding, on the basis of the communicated status information, whether or not the frame is to be moved along the rail by the drive means;
    wherein the status information comprises information on at least one of the following aspects:
    the position of a movable object in the vicinity of the stair lift, which, in a particular position thereof, forms an obstacle to the functioning of the stair lift, to which end the object is provided with means for detecting the position of the object and with means connected to the communication network for communicating the status information to the central processing unit; or
    the position of a movable object on the carrier which is detected before the object hits an obstacle in the vicinity of the stair lift, to which end the obstacle is provided with means for detecting the approach of the object and with means connected to the communication network for communicating the status information to the central processing unit.

2. The stair lift according to claim 1, wherein the status information further comprises information on at least one of the following aspects:
    the position of a movable rail portion of the rail;
    the remaining capacity of a battery which supplies power to a component of the stair lift that is not present on the frame.

3. A stair lift according to claim 1, wherein the wireless communication network is an RF communication network that can operate at several pre-adjustable frequencies.

4. A stair lift according to claim 1, wherein the stair lift comprises an indicator unit which is preferably present on the carrier and which informs the user about the status of the stair lift, which indicator unit is provided with means connected to the communication network, wherein the central processing unit and the indicator unit are designed to communicate at least the locking status of the stair lift to the user.

5. The stair lift according to claim 1, wherein the central processing unit is designed to change the locking status after a predetermined period of inactivity of the stair lift, such that a user must change the locking status anew in order to be able to cause the frame to move along the rail, whether or not via control means and the drive means.

6. The stair lift device according to claim 1 wherein the stair lift further comprises a remote control unit provided with means connected to the communication network, by means of which the user can change the locking status.

7. The stair lift according to claim 1 wherein the stair lift is provided with control units which are fixedly mounted to the carrier, at a fixed location near the upper side of the staircase and at a fixed location near the bottom side of the staircase, by means of which a user can cause the frame to move along the rail via the drive means and which are provided with means connected to the communication network.

* * * * *